United States Patent
Lin et al.

(10) Patent No.: US 10,034,325 B2
(45) Date of Patent: Jul. 24, 2018

(54) ENHANCE AT COMMAND FOR BACKOFF TIMER CONTROL

(71) Applicant: MEDIATEK INC., Hsinchu (TW)

(72) Inventors: Yuan-Chieh Lin, Taipei (TW); Chien-Chun Huang-Fu, Hsinchu (TW); Yu-Syuan Jheng, Taipei (TW); Marko Niemi, Oulu (FI); Chi-Hsien Chen, Taipei (TW)

(73) Assignee: MEDIATEK INC., HsinChu (TW)

( * ) Notice: Subject to any disclaimer, the term of this patent is extended or adjusted under 35 U.S.C. 154(b) by 120 days.

(21) Appl. No.: 15/273,921

(22) Filed: Sep. 23, 2016

(65) Prior Publication Data

US 2017/0094707 A1 Mar. 30, 2017

Related U.S. Application Data

(60) Provisional application No. 62/222,962, filed on Sep. 24, 2015.

(51) Int. Cl.
*H04W 48/06* (2009.01)
*H04W 76/18* (2018.01)
(Continued)

(52) U.S. Cl.
CPC ....... *H04W 76/18* (2018.02); *H04W 28/0289* (2013.01); *H04W 48/06* (2013.01);
(Continued)

(58) Field of Classification Search
CPC .............. H04W 48/06; H04W 76/027; H04W 28/0289; Y02B 60/50
See application file for complete search history.

(56) References Cited

U.S. PATENT DOCUMENTS

| 5,838,226 A | 11/1998 | Houggy et al. ............. 340/12.32 |
| 8,588,163 B2 | 11/2013 | Lin et al. ...................... 370/329 |

(Continued)

FOREIGN PATENT DOCUMENTS

| CN | 104641682 A | 10/2011 |
| EP | 2685747 A1 | 1/2017 |

(Continued)

OTHER PUBLICATIONS

USPTO, notice of allowance for related U.S. Appl. No. 15/273,886 dated May 3, 2017 (9 pages).

(Continued)

*Primary Examiner* — Gary Mui
(74) *Attorney, Agent, or Firm* — Imperium Patent Works; Zheng Jin

(57) ABSTRACT

AT commands are used for controlling Mobile Termination (MT) functions and GSM/UMTS network services from a Terminal Equipment (TE) through Terminal Adaptor (TA). 3GPP introduces multiple backoff timers and barring to solve network congestion problem. However, a TE does not know the timer value and the barring status. In accordance with one novel aspect, a new AT command interface that can respond timer value and barring status to the TE is proposed. It reduces wasteful retries and saves power consumption of the TE. Through the new AT command interface, the TE can query backoff timer status. Via unsolicited result code (URC), the MT can detect backoff timer status change and report updated backoff timer status to the TE.

20 Claims, 9 Drawing Sheets

(51) Int. Cl.
*H04W 28/02* (2009.01)
*H04W 76/02* (2009.01)
*H04W 52/02* (2009.01)

(52) U.S. Cl.
CPC ...... *H04W 76/027* (2013.01); *H04W 52/0209* (2013.01); *Y02D 70/00* (2018.01); *Y02D 70/1224* (2018.01); *Y02D 70/1242* (2018.01); *Y02D 70/1262* (2018.01)

(56) References Cited

U.S. PATENT DOCUMENTS

| | | | |
|---|---|---|---|
| 9,037,141 B2 | 5/2015 | Liao | 455/445 |
| 2002/0059493 A1 | 5/2002 | Williams et al. | 710/305 |
| 2005/0001557 A1 | 1/2005 | Walko, Jr. et al. | 315/149 |
| 2005/0101314 A1 | 5/2005 | Levi | 455/423 |
| 2005/0243058 A1 | 11/2005 | Morris et al. | 345/158 |
| 2012/0238236 A1* | 9/2012 | Liao | H04W 76/007 455/404.2 |
| 2012/0238270 A1* | 9/2012 | Arava | H04W 8/183 455/435.2 |
| 2012/0257571 A1 | 10/2012 | Liao | 370/328 |
| 2012/0257658 A1 | 10/2012 | Chang et al. | 375/222 |
| 2013/0107863 A1 | 5/2013 | Faccin et al. | 370/331 |
| 2013/0148532 A1 | 6/2013 | Poon et al. | 370/252 |
| 2013/0182644 A1* | 7/2013 | Kim | H04W 76/025 370/328 |
| 2014/0018055 A1 | 1/2014 | Majewski | 455/418 |
| 2014/0029530 A1* | 1/2014 | Kim | H04W 48/10 370/329 |
| 2014/0136709 A1 | 5/2014 | Chin et al. | 709/226 |
| 2014/0334427 A1 | 11/2014 | Sun | 370/329 |
| 2016/0057236 A1 | 2/2016 | Van Tienen et al. | 709/227 |
| 2016/0219451 A1* | 7/2016 | Gupta | H04W 72/005 |
| 2017/0094443 A1 | 3/2017 | Kim et al. | 370/329 |
| 2017/0181084 A1* | 6/2017 | Sun | H04W 52/0225 |
| 2017/0295536 A1* | 10/2017 | Kim | H04W 48/06 |

FOREIGN PATENT DOCUMENTS

| | | |
|---|---|---|
| WO | WO2014078604 A2 | 11/2012 |
| WO | WO2014105995 A1 | 12/2012 |

OTHER PUBLICATIONS

International Search Report and Written Opinion of International Search Authority for PCT/CN2016/100101 dated Dec. 29, 2016 (12 pages).

3GPP TSG-CT WG1 Meeting #98 C1-162909, MediaTek Inc., + CABTSR: AT command for SM back-off timer status reporting, Osaka, Japan dated May 23-27, 2016 (5 pages).

International Search Report and Written Opinion of International Search Authority for PCT/CN2016/100103 dated Jan. 3, 2017 (12 pages).

3GPP TSG-CT Wg1 Meeting #98 C1-162910, MediaTek Inc., + CABTRDP: AT command for SM back-off timer query, Osaka, Japan dated May 23-27, 2016 (3 pages).

* cited by examiner

| COMMAND | POSSIBLE RESPONSE(S) |
|---|---|
| +CABTRDP[=<apn>] | [+CABTRDP: <apn>,<residual_backoff_timer>[,<re-attempt_rat_indicator>[,<re-attempt_eplmn_indicator>[,<NSLPI>]]]]<br><br>[<CR><LF>+CABTRDP :<apn>,<residual_backoff_timer>[,<re-attempt_rat_indicator>[,<re-attempt_eplmn_indicator>[,<NSLPI>]]]<br><br>[...]] |
| +CABTRDP=? | +CABTRDP: (list of supported <re-attempt_rat_indicator>s),(list of supported <re-attempt_eplmn_indicator>s),(list of supported <NSLPI>s) |

FIG. 5

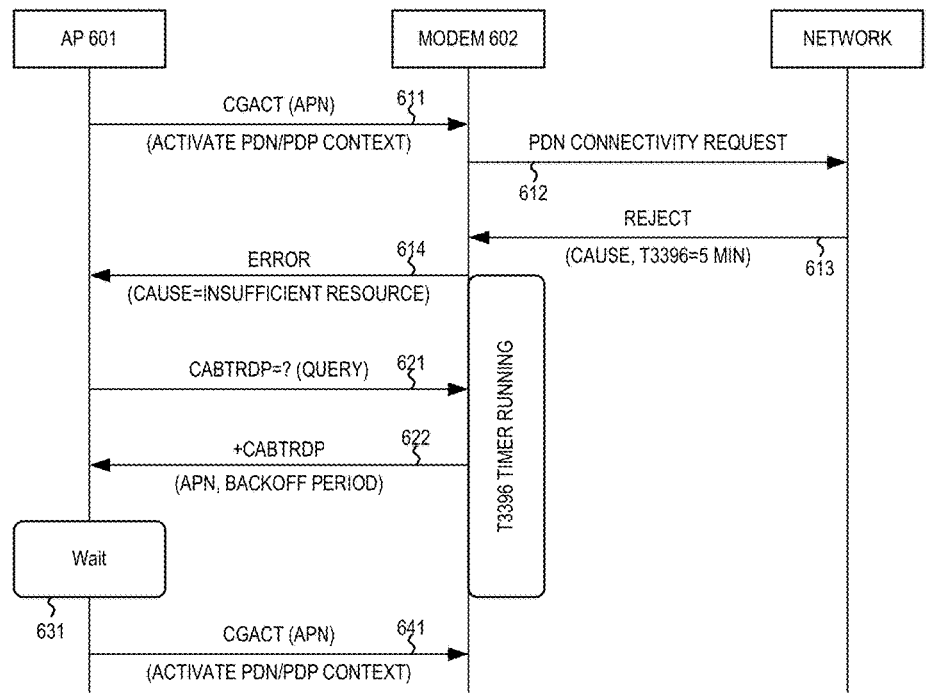

FIG. 6

| COMMAND | POSSIBLE RESPONSE(S) |
|---|---|
| +CGACT=[<state>[,<cid>[,<cid[,...]]]] | +CME ERROR: <err>[,<residual backoff time>] |
| +CGACT? | [+CGACT: <cid>,<state>]<br>[<CR><LF>+CGACT: <cid>,<state><br>[...]] |
| +CGACT? | +CGACT: {list of supported <state>s} |

| COMMAND | POSSIBLE RESPONSE(S) |
|---|---|
| +CABTSR = [<n>] | +CME ERROR: <err> |
| +CABTSR? | +CABTSR: <n> |
| +CABTSR=? | +CABTSR: {list of supported <n>s} |

ENHANCE AT COMMAND FOR BACKOFF TIMER CONTROL

CROSS REFERENCE TO RELATED APPLICATIONS

This application claims priority under 35 U.S.C. § 119 from U.S. Provisional Application No. 62/222,962 filed on Sep. 24, 2015, the subject matter of which is incorporated herein by reference.

TECHNICAL FIELD

The disclosed embodiments relate generally to wireless communication, and, more particularly, to method for controlling backoff timer using enhanced AT commands.

BACKGROUND

The wireless cellular communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). The $3^{rd}$ generation partner project (3GPP) network normally includes a hybrid of 2G/3G/4G systems. With the optimization of the network design, many improvements have developed over various standards, especially in providing wireless IP services via an Evolved Packet System (EPS).

The EPS/IP bearer and connection management and allocation functionality can be provided towards the applications and the terminal devices using an Application Programming interface (API). For external applications, the EPS/IP bearer and connection management and allocation functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA).

3GPP introduces multiple timers to solve network congestion problem. For example, when a session management or EPS session management (SM/ESM) request is rejected by the network, the network may trigger a session management timer for APN based congestion control. Before the timer expiry, any further SM/ESM request triggered by the TE side will always fail because such request is barred by the network. However, the TE does not understand this barring situation and it keeps trying. Such blind retrying cause heavy power consumption since the retry will not succeed until the barring is canceled upon timer expiry and the TE cannot enter sleep mode. In the current standard, the TE has no formal way to know how long each APN is barred by the network due to network congestion.

A solution is sought for controlling backoff timer via the use of AT commands for responding barring status to the TE. It can reduce wasteful retries to save power consumption.

SUMMARY

AT commands are used for controlling Mobile Termination (MT) functions and GSM/UMTS network services from a Terminal Equipment (TE) through Terminal Adaptor (TA). 3GPP introduces multiple backoff timers and barring to solve network congestion problem. However, a TE does not know the timer value and the barring status. In accordance with one novel aspect, a new AT command interface that can respond timer value and barring status to the TE is proposed. It reduces wasteful retries and saves power consumption of the TE. Through the new AT command interface, the TE can query backoff timer status. Via unsolicited result code (URC), the MT can detect backoff timer status change and report updated backoff timer status to the TE.

In one embodiment, a terminal equipment (TE) transmits a first AT command in a mobile communication network. The first AT command is for querying backoff timer status information associated with a PDN connectivity request. The TE receives a response from a mobile termination (MT). The response includes the backoff timer status information. The TE schedules a second AT command associated with requesting PDN connectivity based on the backoff timer status information such that the second AT command is not barred by the network.

In another embodiment, a mobile termination (MT) receives a first AT command from a collocated terminal equipment (TE) of a user equipment (UE) in a mobile communication network. The first AT command is for querying backoff timer status information associated with a PDN connectivity request. The MT determines the backoff timer status information and transmits a response to the TE. The TE schedules a second AT command associated with requesting PDN connectivity base on the backoff timer status information such that the second AT command is not barred by the network.

In one more embodiment, a mobile termination (MT) determines backoff timer status information associated with an APN for establishing a PDN connection in a mobile communication network. The MT detects whether the backoff timer status information has changed. The MT determines whether backoff timer status reporting is enabled by a terminal equipment (TE). The MT transmits updated backoff timer status information to the TE via an unsolicited result code (URC) if the backoff timer status information has changed and if backoff timer status reporting is enabled.

In yet another embodiment, a terminal equipment (TE) transmits a first AT command in a mobile communication network. The first AT command is for configuring backoff timer status reporting associated with a PDN connectivity request. The TE receives updated backoff timer status information from a mobile termination (MT) via an unsolicited result code (URC) if the backoff timer status information has changed and if backoff timer status reporting is enabled. The TE schedules a second AT command associated with requesting a PDN connectivity for the APN based on the updated backoff timer status information such that the second AT command is not barred by the network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates a first embodiment of an AT command +CABTRDP for acquiring a list of backoff timer status including residual timer value for each APN in accordance with one novel aspect.

FIG. 6 illustrates a message flow between a TE and an MT for querying backoff timer status by the TE corresponding to the first embodiment.

DETAILED DESCRIPTION

Reference will now be made in detail to some embodiments of the invention, examples of which are illustrated in the accompanying drawings.

Figure 1:
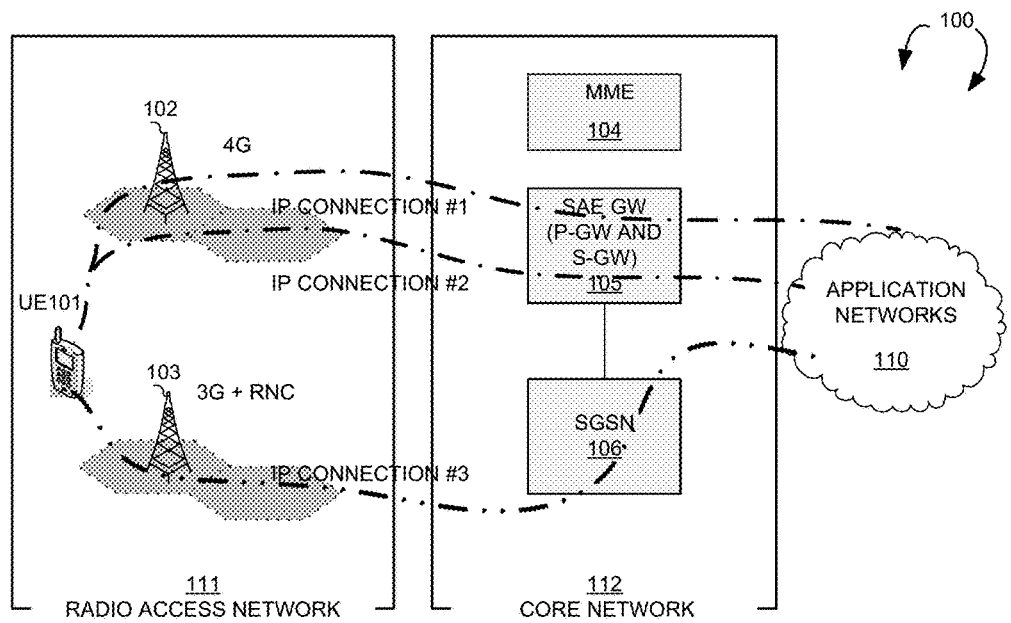
FIG. 1 illustrates an exemplary 3GPP wireless network and a user equipment (UE) with backoff timer control in accordance with one novel aspect.

FIG. 1 illustrates an exemplary 3GPP wireless network with backoff timer control for a user equipment (UE) in accordance with one novel aspect. 3GPP system 100 is a Public Land Mobile Network (PLMN) or an Equivalent Public Land Mobile Network (EPLMN) that supports one or more wireless radio access technology (RAT) networks, such as a 4G/LTE system, a 3G system, and possibly a 2G system (not shown). Each of the 3GPP system has a fixed base infrastructure unit, such as wireless communications stations 102 and 103, forming wireless networks distributed over a geographical region. The base unit may also be referred to as an access point, an access terminal, a base station, a NodeB, an eNodeB, or by other terminology used in the art. Each of the wireless communications stations 102 and 103 serves a geographic area. A 4G/LTE system has an evolved node-B (eNodeB) 102 connecting with a system architecture evolution (SAE) gateway 105, which includes the serving gateway (S-GW) and the packet data network (PDN) gateway (P-GW). A 3G system has a node-B 103 and a radio network controller (RNC). The RNC of the 3G system connects with a serving GPRS support node (SGSN) 106, which is connected to SAE gateway 105.

A wireless communications device/user equipment (UE) 101 in 3GPP system 100 can be served by eNodeB 102 or by node-B 103 of the radio access network (RAN) 111 to access application networks or the Internet 110 through core network 112. UE 101 establishes a bearer with 3GPP system 100 for data services. UE 101 establishes EPS bearer in the 4G system via S1 interface, or establishes a PDP context in the 3G system via Iu interface. For IP networks, the EPS bearer or PDP context is also referred to as a PDN or IP connection. In the example of FIG. 1, to establish an EPS bearer in the 4G system, UE 101 sends a PDN connectivity request to eNodeB 102. UE 101 may establish multiple PDN connections simultaneously, e.g., IP connection #1 and IP connection #2 as depicted. Alternatively, UE 101 may establish one or more PDN connections in the 3G system, e.g., IP connection #3 as depicted.

The EPS/IP bearer and connection management and allocation functionality can be provided towards the applications and the terminal devices using an Application Programming interface (API) based on Packet Data Protocol (PDP) contexts. A PDP context can be regarded as a data record of parameters that characterize a specific bearer and connection to the target PDN. Multiple applications running on one UE may require multiple connections to one or more PDNs, so that multiple PDP contexts may have to be defined. These multiple PDP contexts can be grouped into primary PDP contexts (also referred to as non-secondary PDP contexts) and secondary PDP contexts. Multiple primary PDP contexts provide connections to different PDNs are each associated with a unique IP address.

For external applications, the EPS/IP bearer and connection management and allocation functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). In the example of FIG. 1, UE 101 comprises a TE, a TA, and an MT. TE can use AT commands to control MT to perform bearer and connection management and allocation functionality. For example, TE can use AT commands for requesting PDN connection, for querying PDP context information, and for setting PDP context parameters. 3GPP introduces multiple timers and barring to solve network congestion problem. However, the TE does not know the timer value and the barring status. In accordance with one novel aspect, a new AT interface that can respond barring status to the TE is proposed. It reduces wasteful retries and saves power consumption of the TE.

Figure 2:
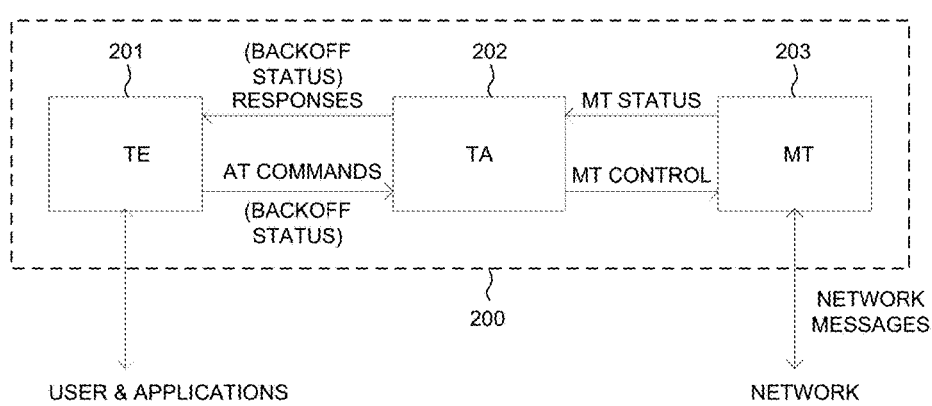
FIG. 2 illustrates a simplified block diagram of an architecture comprising a Terminal Equipment (TE) and a Mobile Termination (MT) interfaced by a Terminal Adaptor (TA) in accordance with one novel aspect.

FIG. 2 illustrates a simplified block diagram of an architecture of a user equipment UE 200 comprising a Terminal Equipment (TE 201) and a Mobile Termination (MT 203) interfaced by a Terminal Adaptor (TA 202) in accordance with one novel aspect. 3GPP TS 27.007 defines a plurality of AT commands for controlling MT functions and GPRS packet domain services based on PDP contexts. Each AT command includes a Context Identification (CID) parameter as reference to the specific PDP context (and the associated Radio Access Bearer (RAB) to which the AT command applies. The TA, MT and TE may be implemented in the form of separate or integrated entities as needed. The span of control of the defined AT commands allows handling of any physical implementation that may lead to: TA, and TE as three separate entities; TA integrated under the MT cover, and TE implemented as a separate entity; TA integrated under the TE cover, and MT implemented as a separate entity; and TA and MT integrated under the cover as a single entity.

In the example of FIG. 2, the AT commands are observed on the link between TE 201 and TA 202. However, most of the AT commands exchange information about the MT, not about the TA. The Interface between TE 201 and TA 202 operates over existing serial cables, infrared link, and all link types with similar behavior. The interface between TA 202 and MT 203 is dependent on the interference within MT 203. In one embodiment, TE 201 sends an AT command to TA 202, which converts to an MT control to be sent to MT 203. The AT commands can be a read command for retrieving backoff timer status from MT 203, or a set command for enabling or disabling automatic backoff timer status reporting for MT 203. In response, MT 203 sends backoff timer status back to TA 202, which converts to a response to be sent to TE 201. The response can include the backoff timer status information.

Figure 3:
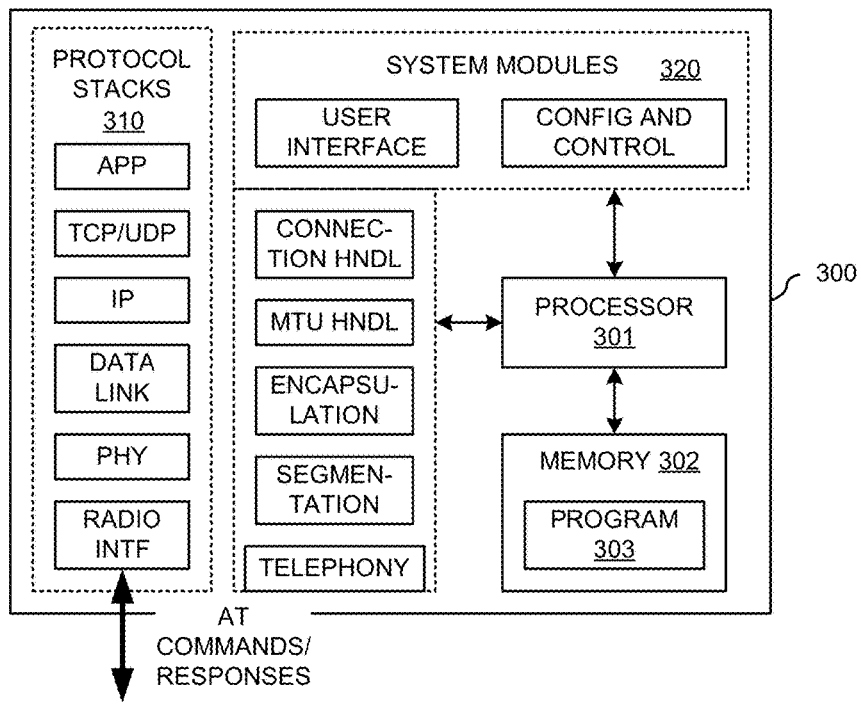
FIG. 3 illustrates a simplified block diagram of a Terminal Equipment (TE) in accordance with embodiments of the current invention.

FIG. 3 illustrates a simplified block diagram of a Terminal Equipment (TE 300) in accordance with embodiments of the current invention. TE 300 comprises a processor 301, memory 302, and protocol stacks 310 including Application (APP) layer, Transport (TCP/UDP) layer, Network (IP) layer, Data Link layer, and Physical (PHY) layer. TE 300 further comprises system control modules 320 including a user interface, a configuration and control module, a connection handler, a MTU handler, an encapsulation module, and a segmentation module. Processor 301 processes different applications and invokes different system control modules to perform various features of TE 300. Memory 302 stores program instructions and data 303 to control the operations of TE 300. The system control modules and circuits can be implemented and configured to carry out functional tasks of TE 300. In one example, TE 300 sends an AT read command to retrieve backoff timer status from the network. In another example, TE 300 sends an AT set command to enable or disable backoff timer status reporting option. The TE 300 can thus determine when to schedule the next PDN connectivity request accordingly without being barred by the network.

For IP data service, TE 300 establishes one or multiple PDN connections to its target PDN. Upon PDN connection establishment, application data needs to be encapsulated and segmented at each layer, from higher layer to lower layer (e.g., TCP→IP→Data Link), and then transmitted in the PHY layer. For example, application data is first encapsulated with TCP/UDP header in transport layer (e.g., TCP or UDP packets), and then encapsulated with IP header and segmented based on MTU size at network layer (e.g., IP packets). The TCP layer may also segment the application data based on Maximum Segmentation Size (MSS) derived from MTU. The above functionalities are handled by the connection handler, the MTU handler, the encapsulation module, and the segmentation module, together with the protocol stacks 310. Typically, TE 300 is also equipped with telephony framework circuits (e.g., a dialer, a call manager etc.) to support voice call functionality. In addition, TE 300 also supports the AT commands as defined by 3GPP TS27.007 for controlling MT functions and GPRS Packet domain services based on PDP contexts, which includes information and parameters for each PDN connection identified by CID.

Figure 4:
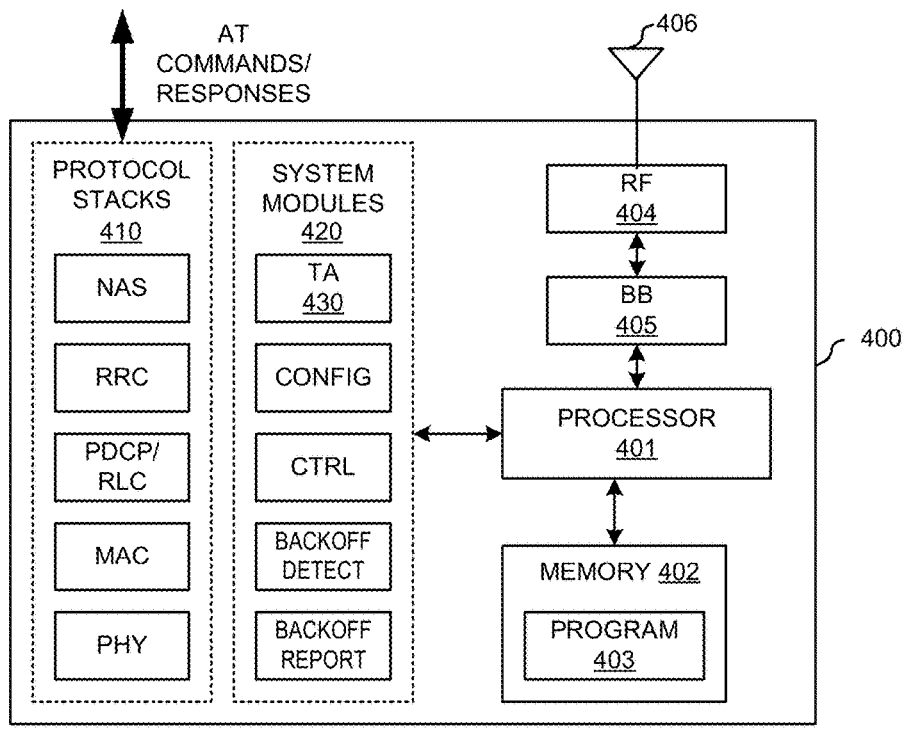
FIG. 4 illustrates a simplified block diagram of a Mobile Termination (MT) in accordance with embodiments of the current invention.

FIG. 4 illustrates a simplified block diagram of a Mobile Termination (MT 400) in accordance with embodiments of the current invention. MT 400 has an antenna 406, which transmits and receives radio signals. A RF transceiver module 404, coupled with the antenna, receives RF signals from antenna 406, converts them to baseband signals and sends them to processor 401 via baseband module 405. RF transceiver 404 also converts received baseband signals from processor 401 via baseband module 405, converts them to RF signals, and sends out to antenna 406. Processor 401 processes the received baseband signals and invokes different functional modules to perform features in MT 400. Memory 402 stores program instructions and data 403 to control the operations of MT 400.

MT 400 also comprises a set of protocol stacks 410 and control circuits including various system modules 420 to carry out functional tasks of MT 400. Protocol stacks 410 comprises Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 420 comprises a configuration module, a control module, a backoff status detector for detecting any event that triggers the change of backoff status, and backoff status reporting module for reporting backoff timer and status information. In the example of FIG. 4, MT 400 further comprises a Terminal Adaptor (TA 430) that receives and transmits AT commands and converts the AT commands to be processed by processor 401 for controlling MT functions. In one example, TA 430 receives an AT read command from a TE for the MT to retrieve backoff timer status from the network. In another example, TA 430 receives an AT set command from a TE for setting backoff timer status reporting option such that the MT can detect backoff timer status change and report updated backoff timer status accordingly.

FIG. 5 illustrates a first embodiment of an AT command +CABTRDP for acquiring a list of backoff timer status including residual timer value associated with an access point name (APN) in accordance with one novel aspect. The TE can use the query result to schedule the retry for each APN. As illustrated in FIG. 5, the AT+CABTRDP command is a read or test command. The execution of the read command returns the relevant information for an APN in the current RAT and PLMN combination. If the parameter <apn> is omitted in the AT command, then the relevant information for all APNs associated with session management backoff timers in the current RAT and PLMN combination is returned. The execution of the test command returns values supported as compound values. In another example, the AT command +CABTRDP is referred to as +CABTS[=<apn>]. AT command +CABTS queries the residual backoff timer, Re-attempt indicator, and the NAS Signalling Low Priority Indication of each <apn>. The TE can use the query result to schedule the retry schedule for each <apn>.

The defined values of the relevant information for AT command +CABTRDP include: <apn>: string type—A logical name that was used to select the GGSN or the external data network; <residual_backoff_timer>: integer type—Indicate the residual back-off timer value associated with the <apn> in seconds; <re-attempt-rat-indicator>: integer type—Indicate whether the UE is allowed to re-attempt the corresponding session management procedure for the same APN after inter-system change. A value of 0 indicates that re-attempt the session management procedure after inter-system change is allowed. A value of 1 indicates that re-attempt the session management procedure after inter-system change is not allowed; <re-attempt_eplmn_indicator>: integer type—Indicate whether the UE is allowed to re-attempt the corresponding session management procedure for the same APN in an equivalent PLMN. A value of 0 indicates that re-attempt the session management procedure in an equivalent PLMN is allowed. A value of 1 indicates that re-attempt the session management procedure in an equivalent PLMN is not allowed; <NSLPI>: integer type—Indicates the NAS signaling priority requested for this PDN connection. A value of 0 indicates that this PDN connection was activated with the value for NAS signaling low priority indicator set to "MS is configured for NAS signaling low priority". A value of 1 indicates that this PDN connection was activated with the value for NAS signaling low priority indicator set to "MS is not configured for NAS signaling low priority". Note that multiple PDN connections may exist. If a normal priority PDN connection is barred, then low priority PDN connections are also barred. But if a low priority PDN connection is barred, then normal priority PDN connections are not necessary barred.

FIG. 6 illustrates a message flow between a TE 601 and an MT 602 for querying backoff timer status by the TE corresponding to the first embodiment. TE 601 is also referred to as an Application Processor (AP), while MT 602 is also referred to as a Modulator/Demodulator (modem). In step 611, the AP sends an AT command +CGACT to activate PDN/PDP context to establish a PDN connection associated with <apn>=Internet. This connection establishment request is a type of session management request, which can be either a session management (SM) request, or an EPS session management (ESM) request. In step 612, the modem sends a PDN connectivity request to the network in response to the AT command. In step 613, the modem receives a PDN connectivity reject from the network. The reject message further comprises the error cause for such rejection and with a corresponding timer value. In step 614, the modem sends the error response back to the TE with the error cause. However, the error response does not include the timer value. The modem also starts the running of the timer to bar subsequent requests.

In one example, when the session management or EPS session management (SM/ESM) request is rejected by the network with cause code #26 indicating insufficient resource, the network may trigger the session management timer T3396. Under cause value #26, the modem will start T3396 timer to bar subsequent PDN connectivity request and similar request such as BEARER RESOURCE MODIFICATION REQUEST or BEARER RESOURCE ALLOCATION REQUEST for the same APN (e.g., <apn>=Internet). In another example, when the SM/ESM is rejected by the network with cause code that is different from #26, the network may include a Backoff timer value in a session management reject message to regulate the timer interval at which the modem may retry the same procedure. The modem shall start the Backoff timer and shall not send another PDN CONNECTIVITY REQUEST message in the PLMN for the same APN. Until the Backoff timer expires, the UE is switched off or the USIM is changed. The modem shall also refer to the reattempt indicator to decide if the same ESM procedure could be sent in another RAT/EPLMN. Other ESM procedures also have the similar scenario, e.g., bearer resource allocation procedure and bearer resource modification procedure. For the purpose of this application, both T3396 and the Backoff timer are referred to as backoff timers.

In step 621, the AP sends an AT command +CABTRDP for querying the backoff timer status associated with <apn>=Internet. In step 622, the modem sends a response back to the AP in response to the AT command. The response comprises the T3396/Backoff timer value, the residual timer value, or barring status for the APN or for all APNs if APN is not provided. Optionally, the response may also include whether Reattempt is allowed and the NAS signaling priority requested for this PDP context, RAT indicator (indicating the current RAT upon receiving the backoff timer), and timer type (T3396 or Backoff timer) or the corresponding ESM cause. Upon receiving the response, in step 631, the AP waits for the expiry of the T3396 or Backoff timer and schedules for the next try. Upon expiry of the timer, in step 641, the AP can start another AT+CGACT command for activating PDN/PDP context.

The three EMS procedures PDN CONNECTIVITY REQUEST, BEARER RESOURCE MODIFICATION REQUEST, and BEARER RESOURCE ALLOCATION REQUEST have similar network congestion control mechanism. For T3396 timer, if one ESM request is rejected, all three ESM requests are forbidden before T3396 expiry. For Backoff timer, however, if one ESM request is rejected, then only that particular ESM procedure is forbidden before backoff timer expiry. Therefore, the AT command +CABTRDP could additionally include the "forbidden ESM procedure" information to tell the AP side, in the case that the AP cannot derive the forbidden ESM procedures from timer type and corresponding ESM cause information.

Figures 7, 8:
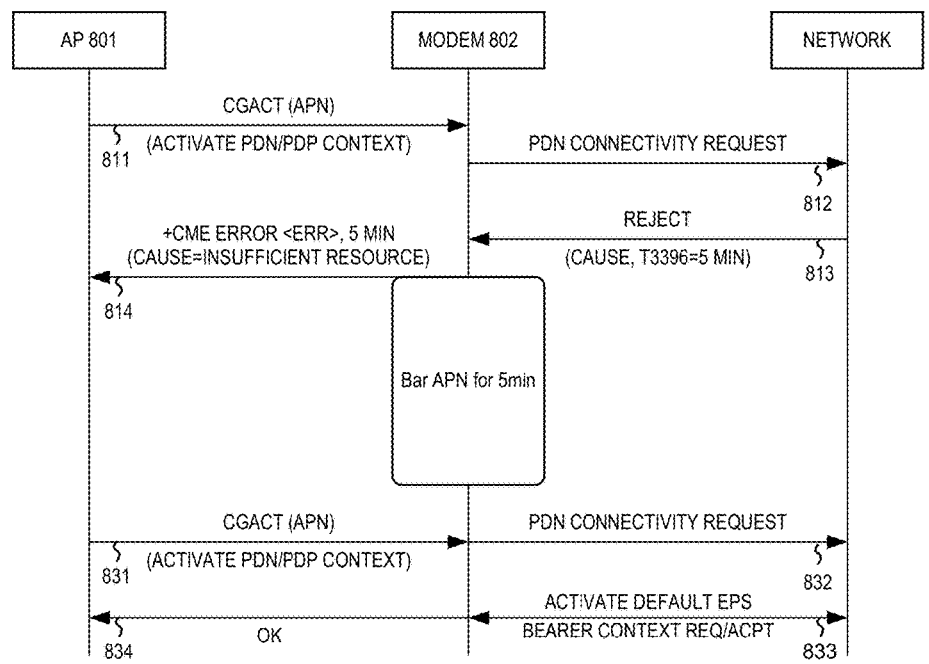
FIG. 7 illustrates a second embodiment of an AT command +CGACT for acquiring a list of backoff timer status including residual timer value for each APN in accordance with one novel aspect.
FIG. 8 illustrates a message flow between a TE and an MT for querying backoff timer status by the TE corresponding to the second embodiment.

FIG. 7 illustrates a second embodiment of an AT command +CGACT for acquiring a list of backoff timer status including residual timer value for each APN in accordance with one novel aspect. In the second embodiment, a new response for existing AT command +CGACT is defined. The new response is defined for reporting backoff timer related status. The response could be a new response or reuse the existing mechanism (i.e., +CME ERROR). The parameters include backoff timer value or residual timer value, reattempt indicator (optional), RAT indicator (optional), and timer type or the corresponding ESM cause (optional). A new event +CME ERROR: <err>[, <residual_backoff_time] may be added for reporting the backoff timer expiry. For example, the event is sent when the Backoff timer for <apn> is expired, or the T3396 for <apn> is stopped or expired. This event can trigger the TE to immediate retry the corresponding SM/ESM procedure of the <apn>.

FIG. 8 illustrates a message flow between a TE 801 and an MT 802 for querying backoff timer status by the TE corresponding to the second embodiment. TE 801 is also referred to as an Application Processor (AP), while MT 802 is also referred to as a Modulator/Demodulator (modem). In step 811, the AP sends an AT command +CGACT to activate PDN/PDP context to establish a PDN connection associated with <apn>=Internet. In step 812, the modem sends a PDN connectivity request to the network in response to the AT command. In step 813, the modem receives a PDN connectivity reject from the network. The reject message further comprises the error cause for such rejection and with a corresponding timer value. For example, the SM error cause #26 indicates insufficient resource with a timer value for T3396.

In step 814, the modem sends the error response back to the TE with the error cause (network congested) and the timer value for T3396. The modem also starts the running of T3396 timer to bar subsequent PDN connectivity request and similar request such as BEARER RESOURCE MODIFICATION REQUEST or BEARER RESOURCE ALLOCATION REQUEST for the same APN (e.g., <apn>=Internet). Because the AP already knows about the T3396 timer, it can wait until T3396 expiry. In step 831, the AP sends another AT command +CGACT to activate PDN/PDP context to establish a PDN connection associated with <apn>=Internet. In step 832, the modem sends a PDN connectivity request to the network in response to the AT command. In step 833, the modem and the network exchanges Activate Default EPS Bearer Context REQUEST and ACCEPT message. Finally, in step 834, the modem sends an OK response back to the AP.

Figure 9:
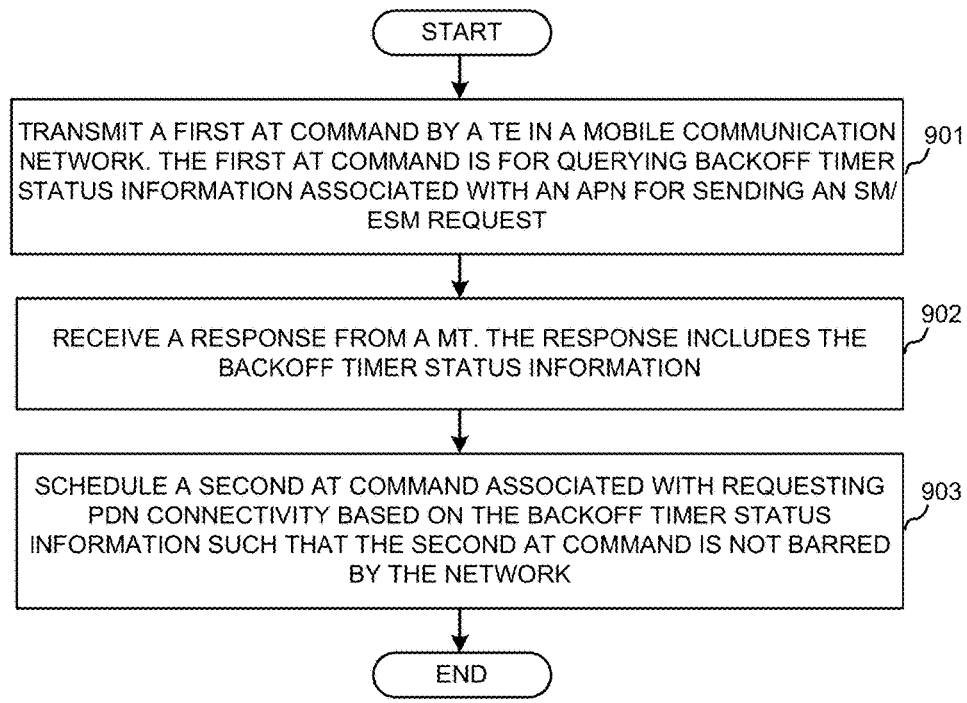
FIG. 9 is a flow chart of a method of backoff timer control from TE perspective in accordance with one novel aspect.

FIG. 9 is a flow chart of a method of backoff timer control from TE perspective in accordance with one novel aspect. In step 901, a terminal equipment (TE) transmits a first AT command in a mobile communication network. The first AT command is for querying backoff timer status information associated with a session management (SM) or ESM request, for example, a PDN connectivity request. In step 902, the TE receives a response from a mobile termination (MT). The response includes the backoff timer status information. In step 903, the TE schedules a second AT command associated with requesting PDN connectivity based on the backoff timer status information such that the second AT command is not barred by the network.

Figure 10:
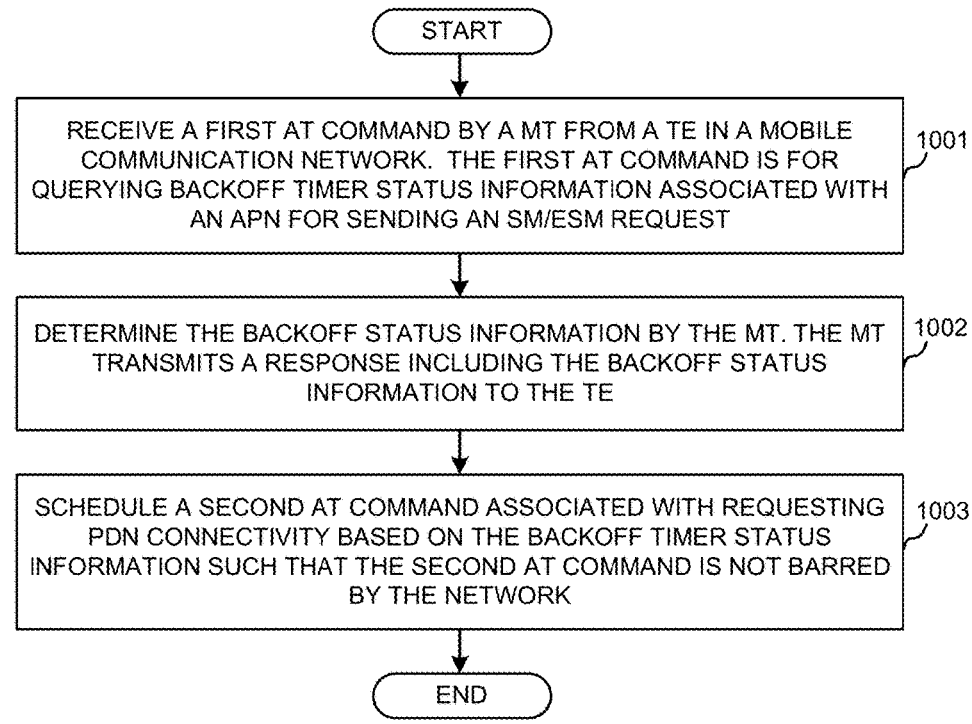
FIG. 10 is a flow chart of a method of backoff timer control from UE perspective in accordance with one novel aspect.

FIG. 10 is a flow chart of a method of backoff timer control from UE perspective in accordance with one novel aspect. In step 1001, a mobile termination (MT) receives a first AT command from a collocated terminal equipment (TE) of a UE in a mobile communication network. The first AT command is for querying backoff timer status information associated with an SM/ESM request. In step 1002, the MT determines the backoff timer status information and transmits a response to the TE. In step 1003, the TE schedules a second AT command associated with requesting PDN connectivity base on the backoff timer status information such that the second AT command is not barred by the network.

Figure 11:
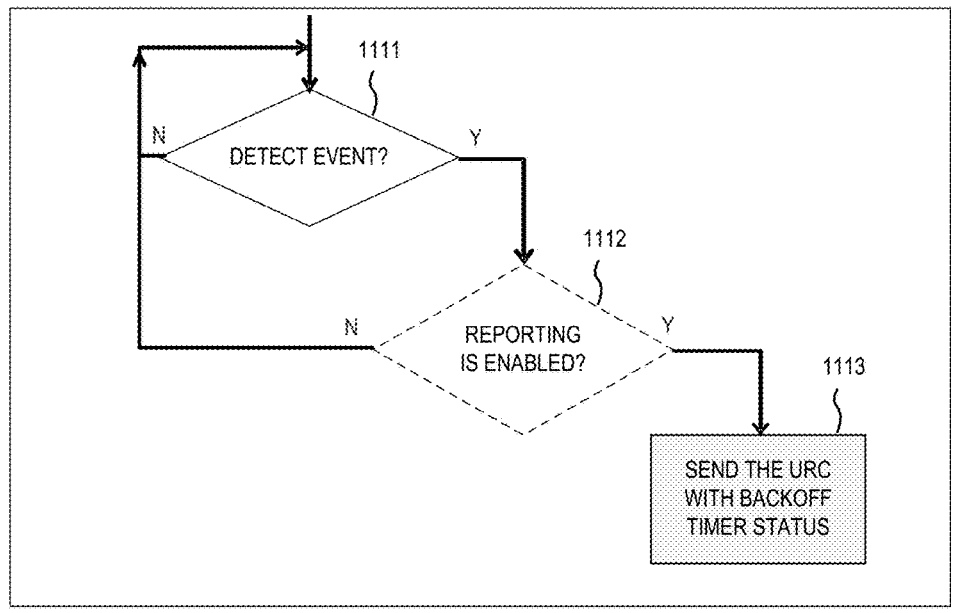
FIG. 11 illustrates a mechanism of reporting backoff timer status by an MT using Unsolicited Request Code (URC) upon detecting status change.

FIG. 11 illustrates a mechanism of reporting backoff timer status information by an MT using Unsolicited Request Code (URC) upon detecting status change. For normal communication between TE and MT, TE will issue AT commands and MT will respond to the AT commands. URC is an exception. URC indicates the occurrence of an event not directly associated with issuance of any AT command from TE. Under URC, MT will actively report predefined events without any AT command from TE. As illustrated in FIG. 11, in step 1111, an MT detects whether the backoff timer status has changed for an APN. This can be detected based on a specific event including: a timer expired, a timer is stopped, a timer is started, a timer or barring status has changed. In step 1112, the MT checks whether backoff timer status reporting is enabled or disabled. In step 1113, if backoff timer status reporting is enabled, then the MT sends URC with the newly updated backoff timer status to the TE without receiving any AT command. Note the step 1112 is optional and may be omitted. The reported backoff timer status includes: APN name; event type; backoff timer value; residual timer value, or barring status; re-attempt indicator; NAS signaling low priority indication; RAT indicator; timer type (T3396 or Backoff timer) or the corresponding ESM cause.

Figure 12:
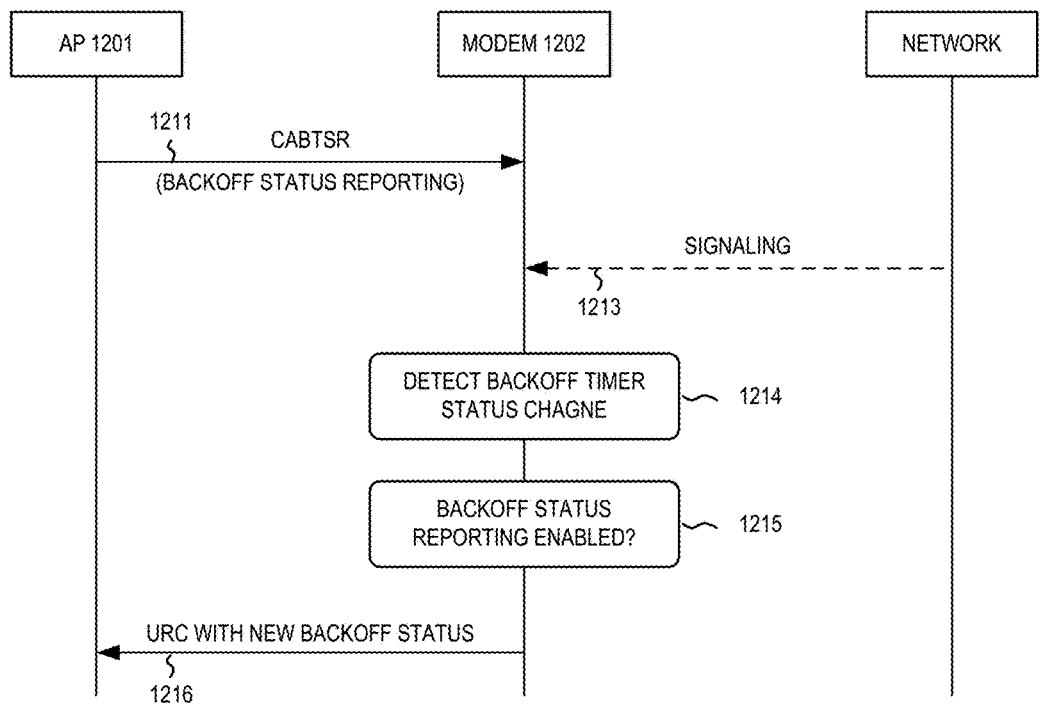
FIG. 12 illustrates a message flow between a TE and an MT for reporting backoff timer status by the MT using URC.

FIG. 12 illustrates a message flow between a TE 1201 and an MT 1202 for reporting backoff timer status by the MT. TE 1201 is also referred to as an Application Processor (AP), while MT 1202 is also referred to as a Modulator/Demodulator (modem). In step 1211, the AP sends an AT command enable or disable backoff status reporting option (e.g., via AT+CABTSR set command). In step 1213, the modem receives a signaling which changes the backoff timer status from the network. For example, when the network sends corresponding SM/ESM request with the APN where the backoff timer is running, the backoff timer is stopped. Or when the network sends paging using IMSI, the backoff timer is stopped. Note that step 1213 is optional. In step 1214, the modem detects whether the backoff timer status has changed from a previous status of the same APN. Note that the modem may detect such status change based on its own internal timer without exchange signaling with the network. Alternatively, the modem may exchange signaling with the network for detecting the status change. In step 1215, the modem checks whether backoff timer status reporting is enabled or disabled. In step 1216, if the backoff timer status has changed and if backoff timer status reporting is enabled, then the modem sends URC with the newly updated backoff timer status to the AP. Note that the modem reports the new backoff timer status info using URC without receiving any specific AT command from the AP.

Figures 13, 14:
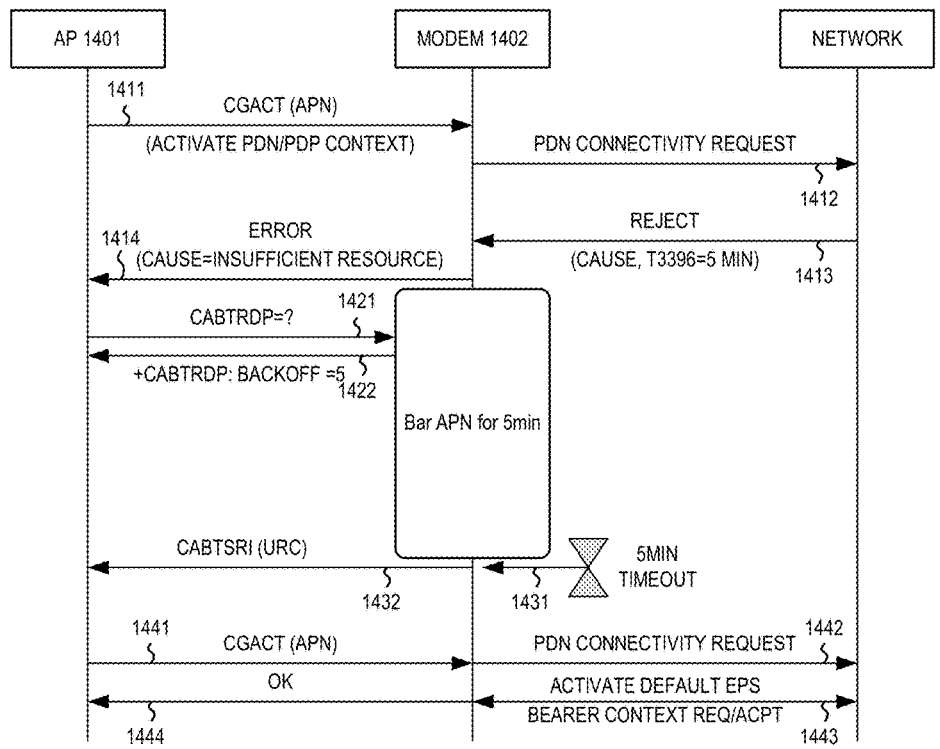
FIG. 13 illustrates a first embodiment of an AT command +CABTSR for reporting backoff timer status using URC in accordance with one novel aspect.
FIG. 14 illustrates a message flow between a TE and an MT for reporting backoff timer status using URC based on the first embodiment.

FIG. 13 illustrates a first embodiment of an AT command +CABTSR for reporting backoff timer status using URC in accordance with one novel aspect. As illustrated in FIG. 13, the AT+CABTSR command is a Set command, Read command, or Test command. The Set command controls the presentation of unsolicited result code (URC) +CABTSRI: <apn>, <event_type>, <residual_backoff_timer>, <re-attempt_RAT_indicator>, <re-attempt_eplmn_indicator>, <NSLPI> reporting the APN backoff timer parameter values from MT to TE if the backoff timer is started, stopped, or expired in the current RAT and PLMN combination. The Read command returns the current APN backoff timer unsolicited result code settings in the MT. The Test command returns values supported as a compound value.

The defined values of the relevant information for URC +CABTSRI include: <n>: integer type—0 indicates disable presentation of the unsolicited result code and 1 indicates enable presentation of the unsolicited result code; <apn>: string type—A logical name that was used to select the GGSN or the external packet data network; <event_type>: integer type—Indicates the event happened to the backoff timer. A value of 0 indicates the backoff timer is started, a value of 1 indicates the backoff timer is stopped, and a value of 2 indicates the backoff timer is expired; <residual_backoff_timer>: integer type—Indicate the residual back-off timer value associated with the <apn> in seconds; <re-attempt_rat_indicator>: integer type—Indicate whether the UE is allowed to re-attempt the corresponding session management procedure for the same APN after inter-system change. A value of 0 indicates that re-attempt the session management procedure after inter-system change is allowed. A value of 1 indicates that re-attempt the session management procedure after inter-system change is not allowed; <re-attempt_eplmn_indicator>: integer type—Indicate whether the UE is allowed to re-attempt the corresponding session management procedure for the same APN in an equivalent PLMN. A value of 0 indicates that re-attempt the session management procedure in an equivalent PLMN is allowed. A value of 1 indicates that re-attempt the session management procedure in an equivalent PLMN is not allowed; <NSLPI>: integer type—Indicates the NAS signaling priority requested for this PDN connection. A value of 0 indicates that this PDN connection was activated with the value for NAS signaling low priority indicator set to "MS is configured for NAS signaling low priority". A value of 1 indicates that this PDN connection was activated with the value for NAS signaling low priority indicator set to "MS is not configured for NAS signaling low priority". Note that multiple PDN connections may exist. If a normal priority PDN connection is barred, then low priority PDN connections are also barred. But if a low priority PDN connection is barred, then normal priority PDN connections are not necessary barred.

FIG. 14 illustrates a message flow between a TE 1401 and an MT 1402 for reporting backoff timer status using URC based on the first embodiment. TE 1401 is also referred to as an Application Processor (AP), while MT 1402 is also referred to as a Modulator/Demodulator (modem). In step 1411, the AP sends an AT command +CGACT to activate PDN/PDP context to establish a PDN connection associated with <apn>=Internet. In step 1412, the modem sends a PDN connectivity request to the network in response to the AT command. In step 1413, the modem receives a PDN connectivity reject from the network. The reject message further comprises the error cause for such rejection and with a corresponding timer value (e.g., T3396=5 min). In step 1414, the modem sends the error response back to the TE with the error cause. The modem also starts the running of T3396 to bar subsequent requests.

In step 1421, the AP sends an AT command +CABTRDP to query backoff timer status. In step 1422, the AP receives a response from the modem, the response comprises the backoff timer value T3396=5 min for <apn>=Internet. In step 1431, the modem detects that the backoff timer T3396 has expired. Triggered by this event, in step 1432, the modem sends URC +CABTSRI to the AP, which comprises the backoff timer status information, e.g., timer expired, residual timer value=0, or barring status=NOT barred. Upon receiving the URC +CABTSRI, the AP knows that it is no longer barred to request a PDN connection for Internet. In step 1441, the AP sends another AT command +CGACT to activate PDN/PDP context to establish a PDN connection associated with <apn>=Internet. In step 1442, the modem sends a PDN connectivity request to the network in response to the AT command. In step 1443, the modem and the network exchanges Activate Default EPS Bearer Context REQUEST and ACCEPT message. Finally, in step 1444, the modem sends an OK response back to the AP.

Figures 15, 16:
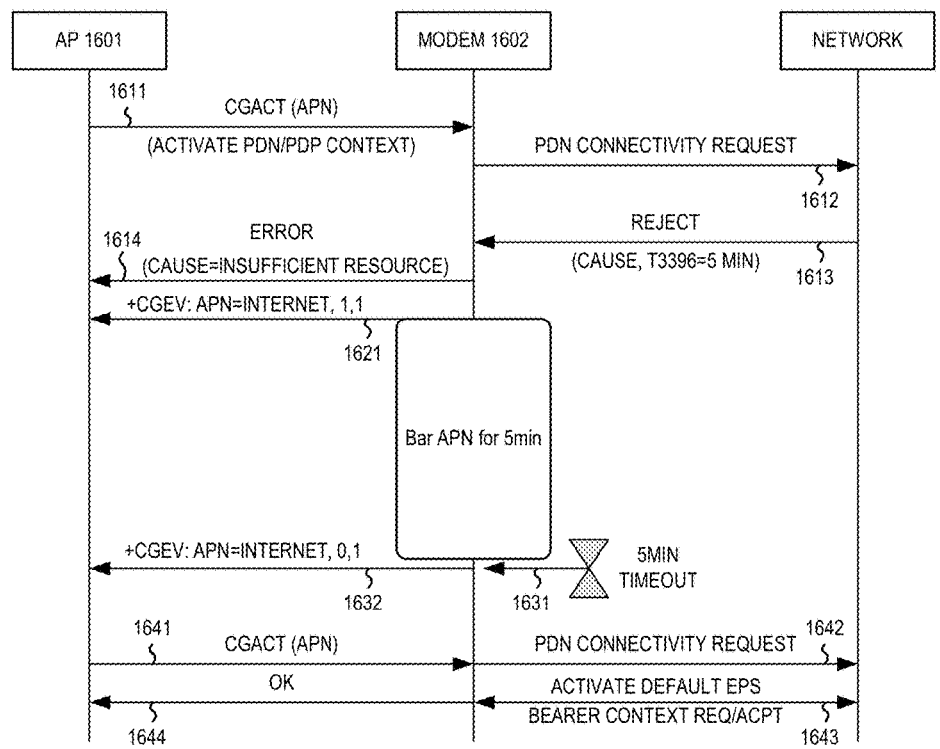
FIG. 15 illustrates a second embodiment of an AT command +CGEREP for reporting backoff timer status using URC in accordance with one novel aspect.
FIG. 16 illustrates a message flow between a TE and an MT for reporting backoff timer status using URC based on the second embodiment.

FIG. 15 illustrates a second embodiment of an AT command +CGEREP for reporting backoff timer status using URC in accordance with one novel aspect. As illustrated in FIG. 15, the AT+CGEREP command is a Set command, Read command, or Test command. The Set command controls the presentation of unsolicited result code (URC) +CGEV: <apn>, <barring status>, <NSLPI> reporting the APN backoff timer status from MT to TE. <barring status>: 0 not barred, 1 barred. When the Backoff timer for <apn> is expired, or the T3396 for <apn> is stopped or expired in the current RAT and PLMN combination, the barring status of the <apn> is changed and the event is sent. This event can trigger the TE to immediately re-try or suppress the corresponding SM/ESM procedure to the <apn>. The Read command returns the current APN backoff timer unsolicited result code settings in the MT. The Test command returns values supported as a compound value.

FIG. 16 illustrates a message flow between a TE 1601 and an MT 1602 for reporting backoff timer status using URC based on the second embodiment. TE 1601 is also referred to as an Application Processor (AP), while MT 1602 is also referred to as a Modulator/Demodulator (modem). In step 1611, the AP sends an AT command +CGACT to activate PDN/PDP context to establish a PDN connection associated with <apn>=Internet. In step 1612, the modem sends a PDN connectivity request to the network in response to the AT command. In step 1613, the modem receives a PDN connectivity reject from the network. The reject message further comprises the error cause for such rejection and with a corresponding timer value (e.g., T3396=5 min). In step 1614, the modem sends the error response back to the TE with the error cause.

In step 1621, the modem starts the running of T3396 to bar subsequent requests. Triggered by this event, the modem sends URC +CGEV to the AP with <apn>=Internet, <barring_status>=1 (indicating barred), and <NSLPI>=1. Upon receiving the URC +CGEV, the AP knows that it is barred to request a PDN connection for Internet. In step 1631, the modem detects that the backoff timer T3396 has expired. Triggered by this event, in step 1632, the modem sends URC +CGEV to the AP with <apn>=Internet, <barring status>=0 (indicating not barred), and <NSLPI>=1. Upon receiving the URC +CGEV, the AP knows that it is no longer barred to request a PDN connection for Internet. In step 1641, the AP sends another AT command +CGACT to activate PDN/PDP context to establish a PDN connection associated with <apn>=Internet. In step 1642, the modem sends a PDN connectivity request to the network in response to the AT command. In step 1643, the modem and the network exchanges Activate Default EPS Bearer Context REQUEST and ACCEPT message. Finally, in step 1644, the modem sends an OK response back to the AP.

Figure 17:
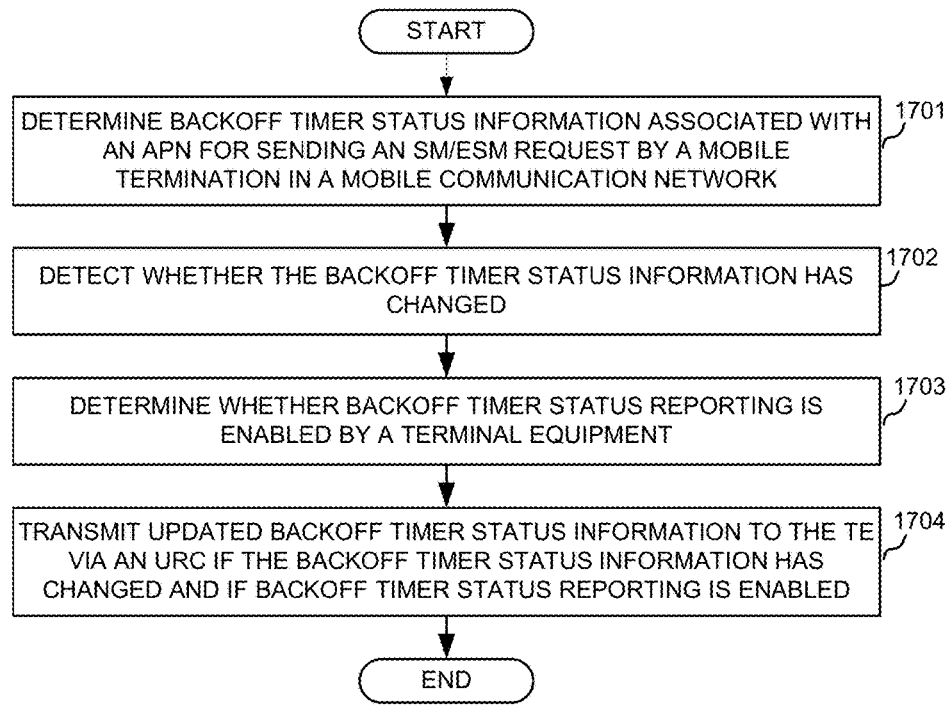
FIG. 17 is a flow chart of a method of controlling backoff timer status reporting from MT perspective in accordance with one novel aspect.

FIG. 17 is a flow chart of a method of controlling backoff timer status reporting from MT perspective in accordance with one novel aspect. In step 1701, a mobile termination (MT) determines backoff timer status information for sending a session management (SM) or ESM request, for example, a PDN connectivity request in a mobile communication network. In step 1702, the MT detects whether the backoff timer status information has changed. In step 1703, the MT determines whether backoff timer status reporting is enabled by a terminal equipment (TE). In step 1704, the MT transmits updated backoff timer status information to the TE via an unsolicited result code (URC) if the backoff timer status information has changed and if backoff timer status reporting is enabled.

Figure 18:
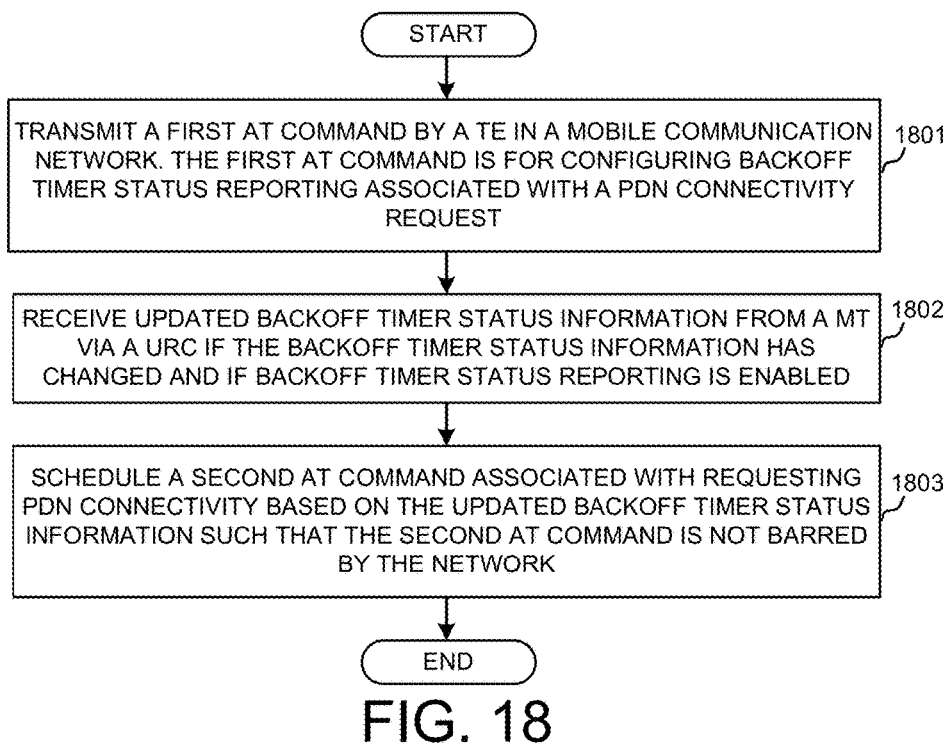
FIG. 18 is a flow chart of a method of controlling backoff timer status reporting from TE perspective in accordance with one novel aspect.

FIG. 18 is a flow chart of a method of controlling backoff timer status reporting from TE perspective in accordance with one novel aspect. In step 1801, a terminal equipment (TE) transmits a first AT command in a mobile communication network. The first AT command is for configuring backoff timer status reporting associated with an SM/ESM request. In step 1802, the TE receives updated backoff timer status information from a mobile termination (MT) via an unsolicited result code (URC) if the backoff timer status information has changed and if backoff timer status reporting is enabled. In step 1803, the TE schedules a second AT command associated with requesting a PDN connectivity for the APN based on the updated backoff timer status information such that the second AT command is not barred by the network.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    determining backoff timer status information associated with an access point name (APN) for sending a session management request by a mobile termination (MT) in a mobile communication network;
    detecting whether the backoff timer status information has changed;
    determining whether backoff timer status reporting is enabled by a terminal equipment (TE); and
    transmitting updated backoff timer status information to the TE via an Unsolicited Result Code (URC) if the backoff timer status information has changed and if backoff timer status reporting is enabled.

2. The method of claim 1, wherein the backoff timer status information comprises a backoff timer value, a residual timer value, or a barring status.

3. The method of claim 1, wherein the backoff timer status information comprises at least one of a reattempt radio access technology (RAT) indicator, a reattempt public land mobile network (PLMN) indicator, a non-access stratum (NAS) signaling low priority indicator, a backoff timer type, a session management or EPS session management (SM/ESM) cause value, and an SM/ESM request.

4. The method of claim 1, wherein the backoff timer status reporting is enabled or disabled via an Attention (AT) command sent from the TE.

5. The method of claim 1, wherein the detecting of the backoff timer status change involves at least one of a backoff timer is started, a backoff timer is stopped, a backoff timer is expired, and a barring status associated with the backoff timer is changed.

6. The method of claim 1, wherein the URC for the updated backoff timer status is transmitted to the TE without receiving a preceding AT command for retrieving the backoff timer status information.

7. The method of claim 1, wherein the MT and the TE are collocated within a user equipment (UE).

8. A Mobile Termination (MT) comprising:
    a backoff timer status detector that determines backoff timer status information associated with an access point name (APN) for sending a session management request in a mobile communication network, wherein the detector also detects whether the backoff timer status information has changed;
    a backoff timer status reporting handler that determines whether backoff timer status reporting is enabled by a terminal equipment (TE); and
    a transmitter that transmits updated backoff timer status information to the TE via an Unsolicited Result Code (URC) if the backoff timer status information has changed and if backoff timer status reporting is enabled.

9. The MT of claim 8, wherein the backoff timer status information comprises a backoff timer value, a residual timer value, or a barring status.

10. The MT of claim 8, wherein the backoff timer status information comprises at least one of a reattempt radio access technology (RAT) indicator, a reattempt public land mobile network (PLMN) indicator, a non-access stratum (NAS) signaling low priority indicator, a backoff timer type, a session management or EPS session management (SM/ESM) cause value, and an SM/ESM request.

11. The MT of claim 8, wherein the backoff timer status reporting is enabled or disabled via an Attention (AT) command sent from the TE.

12. The MT of claim 8, wherein the detecting of the backoff timer status change involves at least one of a backoff timer is started, a backoff timer is stopped, a backoff timer is expired, and a barring status associated with the backoff timer is changed.

13. The MT of claim 8, wherein the URC for the updated backoff timer status is transmitted to the TE without receiving a preceding AT command for retrieving the backoff timer status information.

14. The MT of claim 8, wherein the MT and the TE are collocated within a user equipment (UE).

15. A method comprising:
    transmitting a first Attention (AT) command by a terminal equipment (TE) in a mobile communication network, wherein the first AT command is for configuring backoff timer status reporting associated with an access point name (APN) for sending a session management request;
    receiving updated backoff timer status information from a mobile termination (MT) via an Unsolicited Result Code (URC) if the backoff timer status information has changed and if backoff timer status reporting is enabled; and
    scheduling a second AT command associated with the corresponding SM/ESM request for the APN based on the updated backoff timer status information.

16. The method of claim 15, wherein the backoff timer status information comprises a backoff timer value, a residual timer value, or a barring status.

17. The method of claim 15, wherein the backoff timer status information comprises at least one of a reattempt radio access technology (RAT) indicator, a reattempt public land mobile network (PLMN) indicator, a non-access stratum (NAS) signaling low priority indicator, a backoff timer type, a session management or EPS session management (SM/ESM) cause value, and an SM/ESM request.

18. The method of claim 15, wherein the backoff timer status information further comprises one or more SM/ESM procedures related to a backoff timer type or an SM/ESM cause value.

19. The method of claim 15, wherein the backoff timer status information has changed if at least one of a backoff timer is started, a backoff timer is stopped, a backoff timer is expired, and a barring status associated with the backoff timer is changed.

20. The method of claim 15, wherein the URC for the updated backoff timer status is transmitted to the TE without receiving a preceding AT command for retrieving the backoff timer status information.

* * * * *